United States Patent
Murata et al.

(10) Patent No.: US 9,487,122 B2
(45) Date of Patent: Nov. 8, 2016

(54) VEHICLE-MOUNTED APPARATUS, COMPUTER-READABLE MEDIUM STORING APPLICATION PROGRAM INSTALLED IN PORTABLE INFORMATION TERMINAL, USE RESTRICTION METHOD FOR APPLICATION PROGRAM, PORTABLE INFORMATION TERMINAL, AND VEHICLE-MOUNTED SYSTEM

(75) Inventors: Kenichi Murata, Nissin (JP); Kenji Marunaka, Kariya (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 257 days.

(21) Appl. No.: 13/816,624

(22) PCT Filed: Aug. 11, 2011

(86) PCT No.: PCT/IB2011/001850
§ 371 (c)(1),
(2), (4) Date: Feb. 12, 2013

(87) PCT Pub. No.: WO2012/023017
PCT Pub. Date: Feb. 23, 2012

(65) Prior Publication Data
US 2013/0141227 A1    Jun. 6, 2013

(30) Foreign Application Priority Data
Aug. 20, 2010    (JP) .................................. 2010-184857

(51) Int. Cl.
*B60Q 1/00* (2006.01)
*B60K 28/10* (2006.01)
(Continued)

(52) U.S. Cl.
CPC ................. *B60Q 1/00* (2013.01); *B60K 28/10* (2013.01); *B60K 2350/906* (2013.01); *B60W 50/14* (2013.01); *B60W 2520/10* (2013.01); *H04M 1/6083* (2013.01); *H04M 1/72577* (2013.01)

(58) Field of Classification Search
CPC ... B60Q 1/00; B60K 28/10; B60K 2350/906
USPC .............. 340/5.71–5.74, 438, 670; 455/41.2, 455/418, 466, 550.1; 715/747–748
See application file for complete search history.

(56) References Cited

U.S. PATENT DOCUMENTS 7,898,428 B2 *    3/2011   Dietz et al. .................... 340/670
7,904,061 B1 *    3/2011   Zaffino et al. .............. 455/414.1
(Continued)

FOREIGN PATENT DOCUMENTS

EP    2 099 203 A1    9/2009
FR    2 870 664 A1    11/2005
(Continued)

OTHER PUBLICATIONS

International Search Report for corresponding International Patent Application No. PCT/IB2011/001850 mailed Mar. 6, 2012.

*Primary Examiner* — Hai Phan
*Assistant Examiner* — Royit Yu
(74) *Attorney, Agent, or Firm* — Sughrue Mion, PLLC

(57) ABSTRACT

A vehicle-mounted apparatus outputs caution or warning information to an occupant in a vehicle if the vehicle-mounted apparatus does not continually receive information that shows that an application that is presently being executed in a portable information terminal connected to the vehicle-mounted apparatus has an attribute of being permitted to be used during the moving of a vehicle in which the vehicle-mounted apparatus is mounted.

6 Claims, 7 Drawing Sheets

(51) Int. Cl.
*B60W 50/14* (2012.01)
*H04M 1/60* (2006.01)
*H04M 1/725* (2006.01)

(56) References Cited

U.S. PATENT DOCUMENTS

| | | | |
|---|---|---|---|
| 2003/0060232 A1* | 3/2003 | Hashimoto et al. | 455/556 |
| 2005/0143139 A1* | 6/2005 | Park et al. | 455/567 |
| 2005/0255874 A1* | 11/2005 | Stewart-Baxter et al. | 455/550.1 |
| 2007/0173234 A1 | 7/2007 | Deprun | |
| 2008/0146161 A1* | 6/2008 | Bugenhagen | H04W 16/18 455/67.11 |
| 2009/0001930 A1* | 1/2009 | Pohjonen | 320/108 |
| 2009/0098855 A1* | 4/2009 | Fernandez et al. | 455/410 |
| 2010/0030424 A1 | 2/2010 | Kitagawa | |
| 2010/0138149 A1* | 6/2010 | Ohta et al. | 701/201 |
| 2010/0148923 A1* | 6/2010 | Takizawa | 340/5.82 |
| 2010/0151833 A1* | 6/2010 | Azuma et al. | 455/412.2 |
| 2010/0216509 A1* | 8/2010 | Riemer et al. | 455/557 |
| 2010/0279627 A1* | 11/2010 | Bradley | 455/69 |
| 2012/0046020 A1* | 2/2012 | Tomasini | 455/418 |

FOREIGN PATENT DOCUMENTS

| | | |
|---|---|---|
| JP | 2003-174674 A | 6/2003 |
| JP | 2005-184153 A | 7/2005 |
| JP | 2005-354267 A | 12/2005 |
| JP | 2007-249478 A | 9/2007 |
| JP | 2010-033459 A | 2/2010 |
| JP | 2010-063159 A | 3/2010 |
| JP | 2010-130669 A | 6/2010 |
| JP | 2010-130670 A | 6/2010 |

* cited by examiner

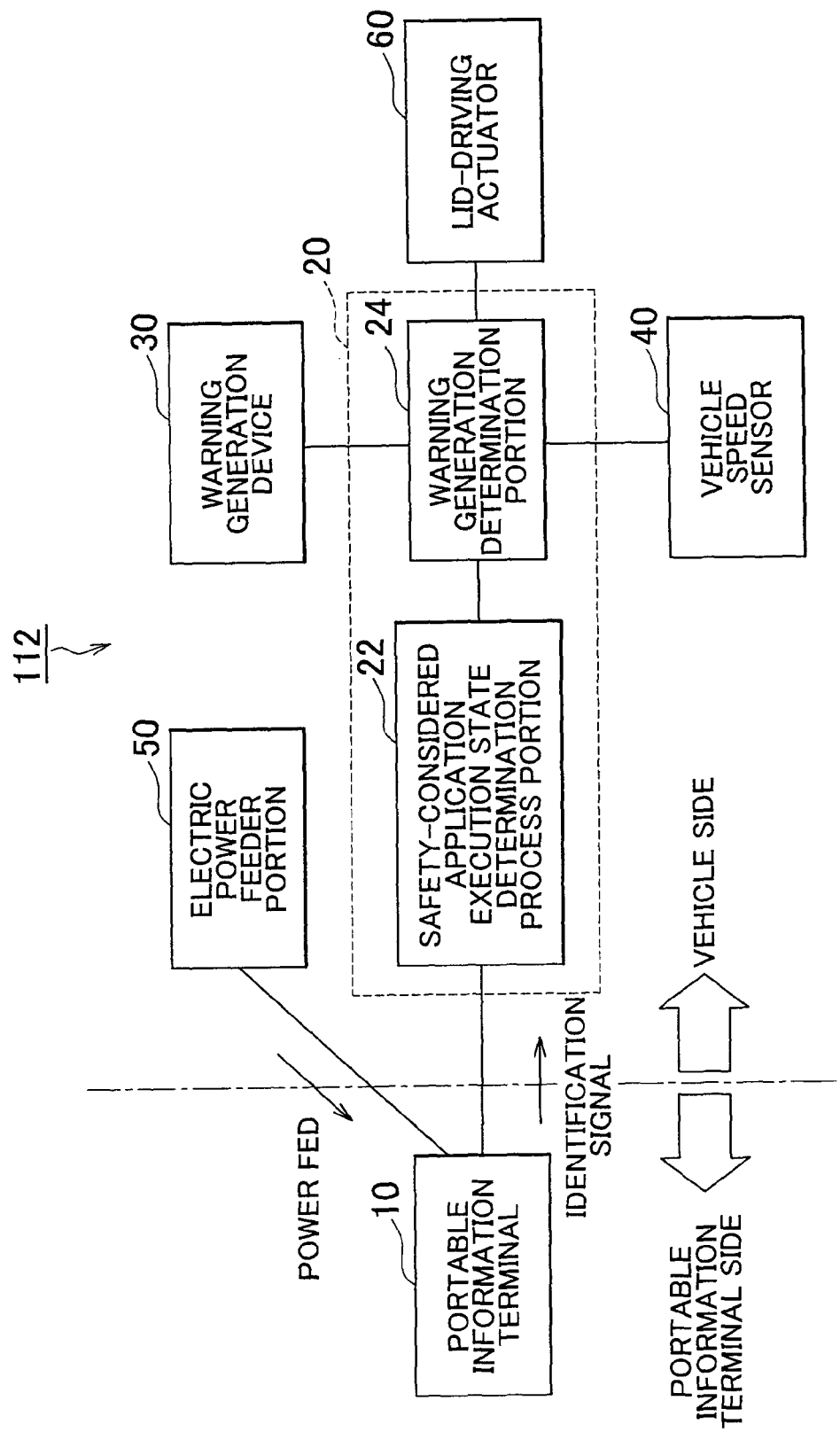

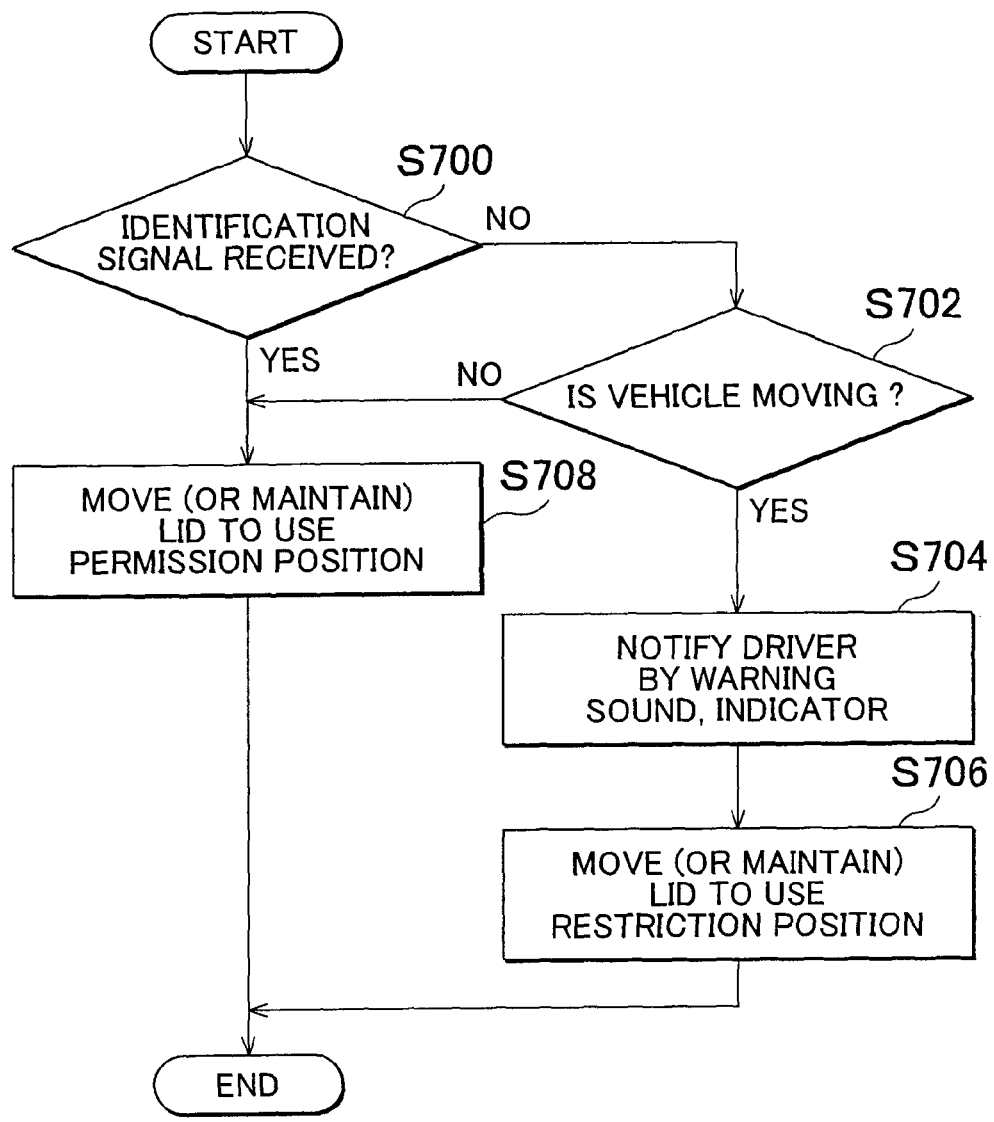

VEHICLE-MOUNTED APPARATUS, COMPUTER-READABLE MEDIUM STORING APPLICATION PROGRAM INSTALLED IN PORTABLE INFORMATION TERMINAL, USE RESTRICTION METHOD FOR APPLICATION PROGRAM, PORTABLE INFORMATION TERMINAL, AND VEHICLE-MOUNTED SYSTEM

BACKGROUND OF THE INVENTION

1. Field of the Invention

The invention relates to a vehicle-mounted apparatus, a computer-readable medium storing an application program installed in a portable information terminal and a use restriction method for the application program, a portable information terminal, and a vehicle-mounted system.

2. Description of Related Art

There is known an information output regulation apparatus that restricts information based on information resource that is output in a manner such that the access to the information resource is possible, and that includes determination means for determining whether or not an information resource has an attribute that is accessible by an occupant in a vehicle that is moving, with respect to each one of information resources, and regulation addition means for associating, when it is determined that an information resource does not have an attribute of being accessible, regulation information for preventing display of information based on the information resource with the information resource, and output means for outputting the information resource or information that the information resource cannot be displayed, to an external device that is able to display the information resource based on the information resource and regulation information (e.g., see Japanese Patent Application Publication No. 2010-033459 (JP-A-2010-033459)).

However, it has been proposed to provide for the in-vehicle use of applications of a portable information terminal, such as a so-called smart phone, that is brought into a vehicle. However, as for the various applications of portable information terminals, some applications are not advisable to use in a vehicle while the vehicle is moving, and some others are quite acceptable to use in a moving vehicle. It is technically feasible to set a function of determining whether an application is acceptable to use in a moving vehicle, at a vehicle-mounted apparatus side or a portable information terminal side. However, it can be difficult to flexibly respond to and keep up with post-setting expansion or diversification of applications. Besides, determining the attribute of an application at the portable information terminal side involves changes in main functions of the portable information terminal, and therefore is difficult.

SUMMARY OF THE INVENTION

The invention provides a vehicle-mounted apparatus, a computer-readable medium storing an application program installed in a portable information terminal and a use restriction method for the application program, a portable information terminal, a vehicle-mounted system, etc., which are capable of appropriately regulating the use of an application of a portable information terminal in a moving vehicle, while requiring only a simple construction.

A vehicle-mounted apparatus of a first aspect of the invention is a vehicle-mounted apparatus to which a portable information terminal loaded with a plurality of applications is connected. The vehicle-mounted apparatus includes a control portion that is configured to output caution or warning information to an occupant in a vehicle if the vehicle-mounted apparatus does not continually receive information that is sent from a portable information terminal connected to the vehicle-mounted apparatus and that shows that an application that is presently being operated in the portable information terminal has an attribute of being permitted to be used during moving of the vehicle.

Besides, an application program of a second aspect of the invention is a computer-readable medium that stores an application program that is installed in a portable information terminal and that is executable when the portable information terminal is connected to a vehicle-mounted apparatus. The application program is constructed so that while the application is being operated with the portable information terminal connected to the vehicle-mounted apparatus, identification information that shows that the application has an attribute of being permitted to be used during moving of a vehicle is continually sent from the portable information terminal to the vehicle-mounted apparatus.

Besides, a method of a third aspect of the invention is an application use restriction method that restricts use of a specific application in a vehicle which is installed in a portable information terminal loaded with a plurality of application, the method including outputting caution or warning information to an occupant in the vehicle so that the occupant does not use an application that is presently being executed in the portable information terminal, if a vehicle-mounted apparatus does not continually receive information that is sent from the portable information terminal connected to the vehicle-mounted apparatus and that shows that the application being presently executed in the portable information terminal has an attribute of being permitted to be used during moving of the vehicle.

A vehicle-mounted apparatus of a fourth aspect of the invention includes: a warning generation device that outputs warning to an occupant in a vehicle so that the occupant does not use a specific application of a portable information terminal; a vehicle speed sensor that detects vehicle speed of the vehicle; a determination process portion that determines whether or not an application that is presently being executed in the portable information terminal connected to the vehicle-mounted apparatus is a safety-considered application that is designed with safety taken into account so that the application is appropriately executable in the vehicle even when the vehicle is moving; and a warning generation determination portion which determines whether or not the vehicle speed is greater than zero based on a signal from the vehicle speed sensor while it is not determined by the determination process portion that the application that is presently being executed is a safety-considered application, and which, if it is determined that the vehicle speed is greater than zero, performs a control such as to cause the warning generation device to output warning.

Besides, a portable information terminal of a fifth aspect of the invention includes a plurality of application programs that are executable when the portable information terminal is connected to a vehicle-mounted apparatus. The plurality of application programs include a safety-considered application that is executable during moving of a vehicle in which the vehicle-mounted apparatus is mounted, and the safety-considered application is constructed so that while the safety-considered application is being operated with the portable information terminal connected to the vehicle-mounted apparatus, identification information that shows that the safety-considered application has an attribute of being permitted to be used during moving of the vehicle is continually sent from the portable information terminal to the vehicle-mounted apparatus.

A vehicle-mounted system of a sixth aspect of the invention includes a portable information terminal; a warning generation device that outputs warning to an occupant in a vehicle; a vehicle speed sensor that detects vehicle speed of the vehicle; a determination process portion that determines whether or not an application that is presently being executed in the portable information terminal connected to the vehicle-mounted apparatus is a safety-considered application; and a warning generation determination portion that determines whether or not the vehicle speed is greater than zero based on a signal from the vehicle speed sensor while it is not determined by the determination process portion that the application that is presently being executed is a safety-considered application, and that, if it is determined that the vehicle speed is greater than zero, performs a control such as to cause the warning generation device to output warning. The portable information terminal has a plurality of application programs that are executable when the portable information terminal is connected to a vehicle-mounted apparatus. The plurality of application programs include a safety-considered application that is executable during moving of the vehicle in which the vehicle-mounted apparatus is mounted, and the safety-considered application is constructed so that while the safety-considered application is being operated with the portable information terminal connected to the vehicle-mounted apparatus, identification information that shows that the safety-considered application has an attribute of being permitted to be used during moving of the vehicle is continually sent from the portable information terminal to the vehicle-mounted apparatus.

According to the foregoing aspects of the invention, it is possible to provide a vehicle-mounted apparatus, a computer-readable medium storing an application program installed in a portable information terminal and use restriction method for the application program, a portable information terminal, a vehicle-mounted system, etc., which are capable of appropriately regulating the use of applications of a portable information terminal in a moving vehicle, while requiring only a simple construction.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a diagram showing an example of a construction related to a vehicle-mounted apparatus according to another embodiment of the invention;

FIG. 7 is a flowchart showing an example of a main process that is executed by a control ECU of a vehicle-mounted apparatus of the embodiment.

DETAILED DESCRIPTION OF EMBODIMENTS

Hereinafter, forms for carrying out the invention will be described with reference to the accompanying drawings.

Figure 1:
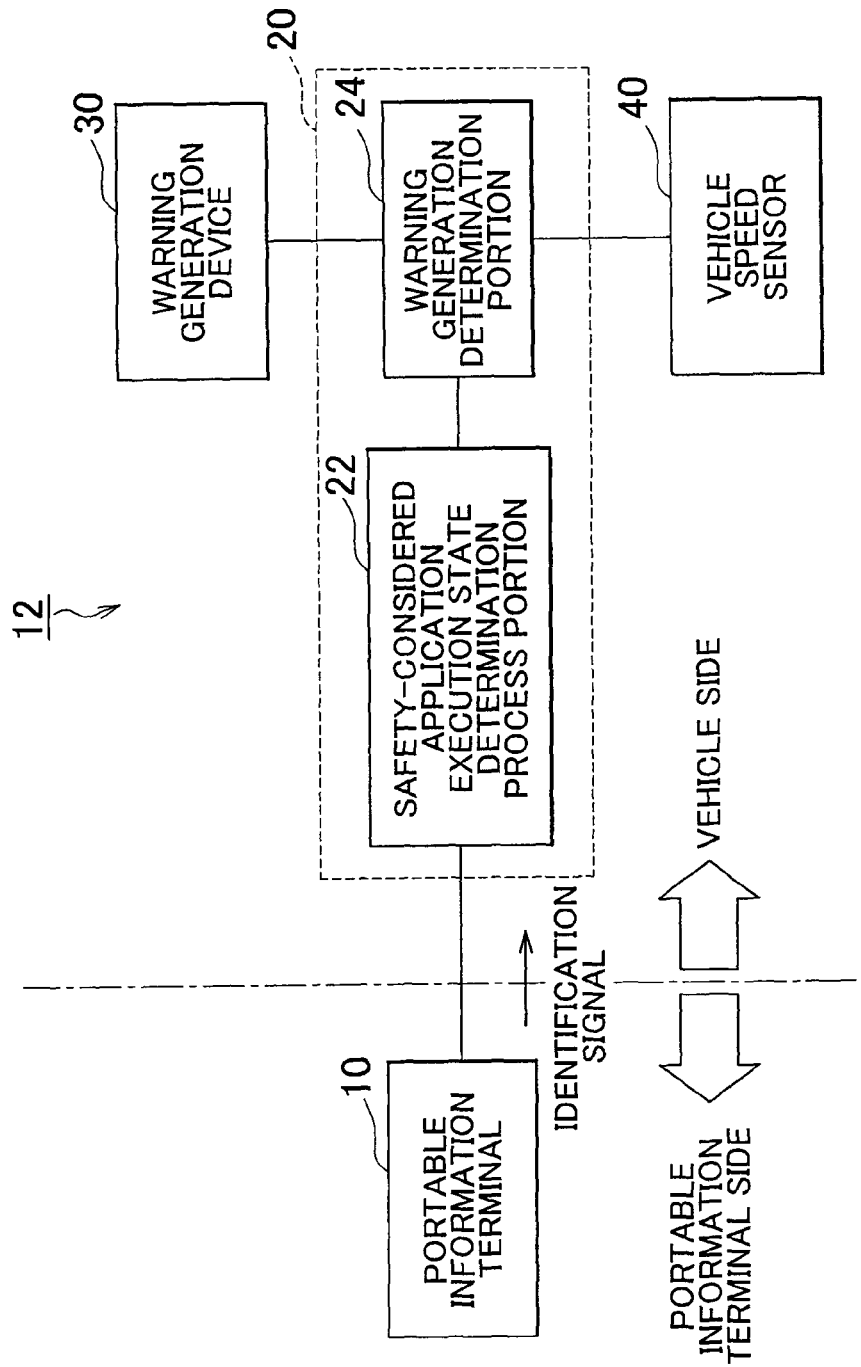
FIG. 1 is a diagram showing an example of a construction related to an embodiment of the vehicle-mounted apparatus of the invention.

A vehicle-mounted apparatus 12 of an embodiment of the invention is constructed of a control ECU 20 as a central component, as shown in FIG. 1. The control ECU 20 is constructed as a microcomputer made up of a CPU, a ROM, a RAM, etc. that are interconnected by a bus (not shown). The ROM stores various programs that the CPU executes.

The control ECU 20 is connected to a warning generation device 30 and a vehicle speed sensor 40.

Figure 2:
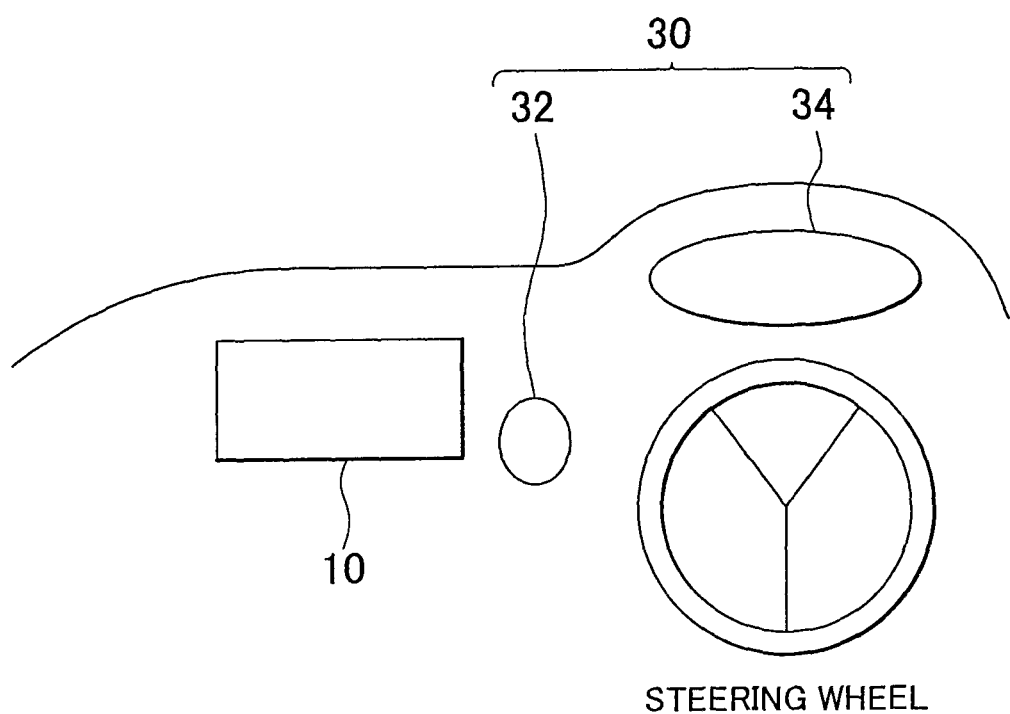
FIG. 2 is a diagram schematically showing an example of a state of the mounting of various component elements in an instrument panel of a vehicle.

The warning generation device 30 outputs caution or warning information (hereinafter, referred to simply as "warning") to a vehicle occupant so that the occupant will refrain from using specific applications of a portable information terminal (i.e., applications other than safety-considered applications described below). The warning that is output by the warning generation device 30 may be in an arbitrary form that utilizes, for example, voice, a video picture, sound, vibration, force, light, heat, etc. The warning output from the warning generation device 30 has a content that means that it is not desirable or not permitted for occupants in a vehicle to use the specific applications during the moving of the vehicle. Typically, the warning generation device 30 may be a warning indicator 32 or a meter 34 that is disposed at a position such that the vehicle occupant can easily see the warning indicator 32 or the meter 34, as schematically shown in FIG. 2. Besides, the warning generation device 30 may include a device that takes a forced measure such that the vehicle occupant will not use the specific applications of the portable information terminal 10 as described below with reference to FIGS. 5 and 6. In examples shown in FIGS. 5 and 6, the picture screen of the portable information terminal 10 is forced to be covered with a lid.

The vehicle speed sensor 40 may be a sensor that detects the wheel speed of the vehicle (vehicle speed pulses). The vehicle speed sensor 40 is used to determine whether or not the vehicle is moving as described below. Therefore, instead of or in addition to the vehicle speed sensor 40, it is permissible to use a sensor that acquires information that indirectly represents the moving of the vehicle, such as an accelerator operation amount sensor, a throttle sensor, a shift position sensor, a parking brake switch, a sensor that detects the amount of operation of a brake pedal, etc. Besides, a GPS receiver or the like may also be used.

The portable information terminal 10 that a vehicle occupant brings for use in the vehicle is connected to the control ECU 20. The portable information terminal 10 is typically a so-called smart phone, but may be any terminal as long as a plurality of applications can be loaded in the terminal. For example, the portable information terminal 10 does not need to have a telephone function. The portable information terminal 10 is loaded with a plurality of applications, and is able to start and execute an arbitrary application on its display screen. The portable information terminal 10 may include a touch panel mounted on the display panel. The applications installed in the portable information terminal 10 may be applications that are originally installed in the portable information terminal 10, or may also be applications that are additionally installed later by choice of a user. The applications may be any applications, including music playback applications, moving image playback applications, applications related to games, newspapers, books, etc. The plurality of applications are roughly divided into safety-considered applications described below, and other applications.

The portable information terminal 10 is generally placed at a location such that the terminal 10 can be safely operated during the moving of the vehicle, that is, a location such that a vehicle occupant can easily see and operate the terminal 10. To this end, a terminal holder (not shown) for placing the portable information terminal 10, such as a cradle or the like, is provided in the vehicle. The terminal holder may be provided, for example, so that the portable information terminal 10 is placed near a central portion of an instrument panel, as schematically shown in FIG. 2.

The portable information terminal 10 is connected to the vehicle-mounted apparatus 12 (the control ECU 20), when it is brought into the vehicle. This connection may be either by wire or wireless. In the case of connection by wire, the USB (universal serial bus) is preferred as an interface. In the case of wireless connection, a Bluetooth (registered trademark) is preferred as an interface.

The control ECU 20, as shown in FIG. 1, includes a safety-considered application execution state determination process portion 22 and a warning generation determination portion 24 as main functions. These portions 22 and 24 may be realized by the CPU of the control ECU 20 executing programs stored in the ROM.

The safety-considered application execution state determination process portion 22 determines whether or not the application that is presently being executed by the portable information terminal 10 that is connected to the vehicle-mounted apparatus 12 is an application that has been designed with safety consideration so that the application cart be executed even in a moving vehicle (hereinafter, referred to as safety-considered application). The safety-considered application execution state determination process portion 22 determines whether or not the application presently being executed in the portable information terminal 10 connected to the vehicle-mounted apparatus 12 is a safety-considered application on the basis of a identification signal that is sent from the portable information terminal 10, as described below. To this end, the safety-considered application is designed so as to send, while in operation, a signal that shows that the application is a safety-considered application (hereinafter, referred to as identification signal) to the vehicle-mounted apparatus 12, as described below with reference to FIG. 3.

The warning generation determination portion 24 commands (controls) the warning generation device 30 to output the warning on the basis of the signal from the vehicle speed sensor 40, if the vehicle speed is greater than zero, while it is not determined by the safety-considered application execution state determination process portion 22 that the presently executed application is a safety-considered application.

Figure 3:
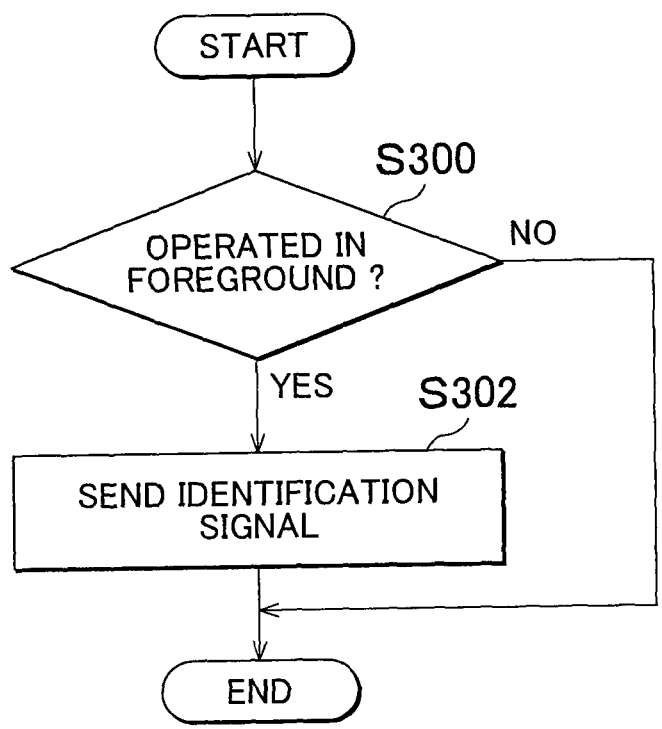
FIG. 3 is a flowchart showing an example of an operation of a safety-considered application installed in a portable information terminal of the embodiment.

FIG. 3 is a flowchart showing an example of an operation of a safety-considered application installed in the portable information terminal 10. The process routine shown in FIG. 3 is started when a safety-considered application is started in the portable information terminal 10, and is repeatedly executed during operation of the safety-considered application. The process routine of FIG. 3 may be executed separately from and in parallel with the processing of a primary process of the safety-considered application (a main process of the safety-considered application), and may be embedded with the main process. The process routine of FIG. 3 may be executed preferably at every period of 1 second or less (e.g., 500 ms).

In step S300 in FIG. 3, it is determined whether or not a safety-considered application is in operation in the foreground in the portable information terminal 10. If a safety-considered application is in operation in the foreground (on the front side) in the portable information terminal 10, the process proceeds to step S302. On the other hand, if a safety-considered application is not in operation in the foreground in the portable information terminal 10 (i.e., is in operation in the background), the process immediately ends.

In step S302, the identification signal (i.e., a signal for showing that the application is a safety-considered application) is generated, and is sent to the vehicle-mounted apparatus 12 (the control ECU 20). The identification signal is preferably sent after being encrypted. The method of the encryption may be arbitrary. Besides a method in which the signal itself is encrypted, it is also permissible to realize the encryption by causing the mode of sending a signal, such as a transmission period, to be a specific mode.

Thus, as shown in FIG. 3, the safety-considered application sends a identification signal continually (e.g., every 500 ms) to the vehicle-mounted apparatus 12 (the control ECU 20) only while the safety-considered application is operating in the foreground of the portable information terminal 10. Therefore, the safety-considered application does not sends the identification signal to the vehicle-mounted apparatus 12 (the control ECU 20) while the safety-considered application is operating in the background of the portable information terminal 10.

Incidentally, the safety-considered application typically is certified through approvable of the automobile manufacturer. Therefore, application producers can produce safety-considered applications by adding a function of sending the identification signal as shown in FIG. 3 to applications they produce, on condition that the applications be approved by the automobile manufacturers. Besides, the standard for the approval of the automobile manufacturer can be arbitrary, but is appropriately determined according to general standards (e.g., a standard that the playback of moving images generally should not be executed in a vehicle during its moving) as well as the safety standards and provisions of law of various countries, etc. Generally, for example, applications compatible with vehicle-mounted navigation apparatuses (applications that display maps and the present locations), applications that read out articles, pieces of information, etc., by voice, applications capable of performing various operations via voice recognition, etc. can be approved as safety-considered applications by automobile manufacturers.

Figure 4:
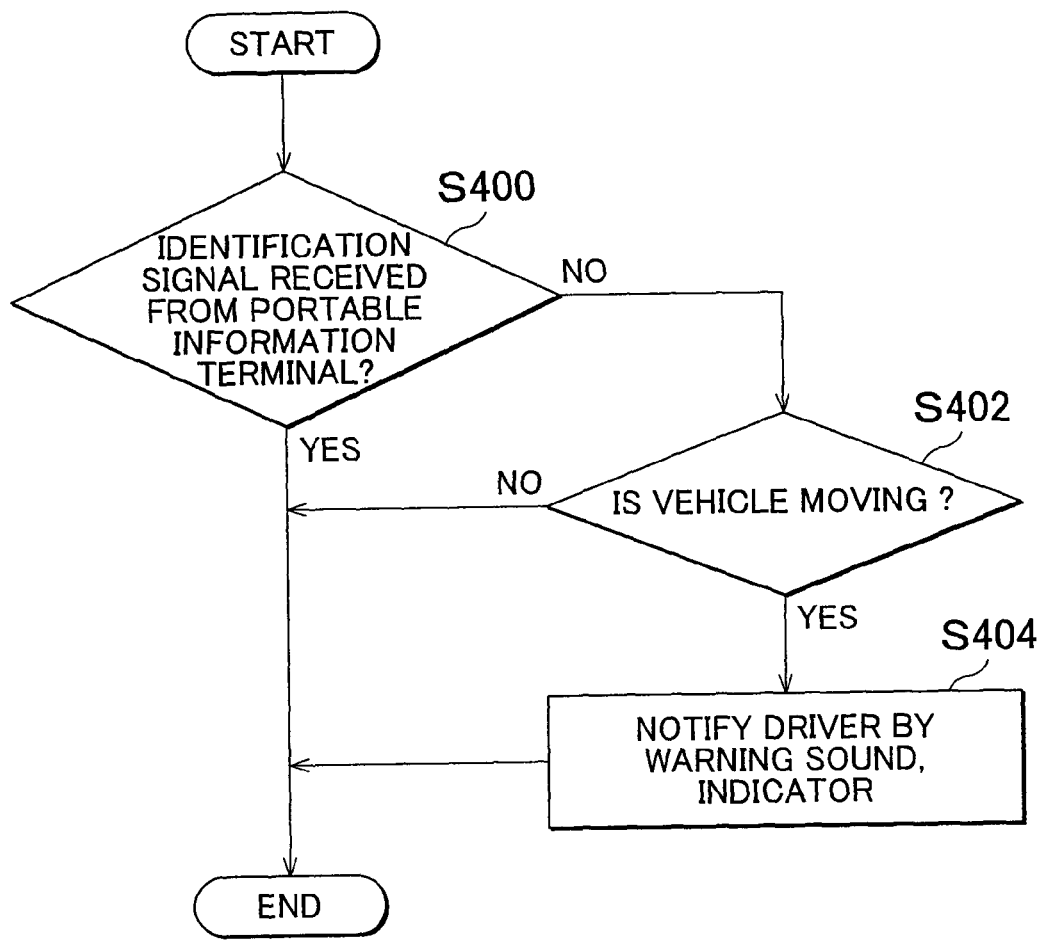
FIG. 4 is a flowchart showing an example of a main process that is executed by a control ECU of the vehicle-mounted apparatus of the embodiment.

FIG. 4 is a flowchart showing an example of a main process that is executed by the control ECU 20 of the vehicle-mounted apparatus 12. The process routine of FIG. 4 is started when the portable information terminal 10 is connected to the vehicle-mounted apparatus 12 either by wire or wirelessly, and is repeatedly executed while the portable information terminal 10 remains connected to the vehicle-mounted apparatus 12.

In step 400, it is determined whether or not the safety-considered application execution state determination process portion 22 is receiving the identification signal that is sent from the portable information terminal 10. If the identification signal from the portable information terminal 10 is being received, there is no need for warning, and the process of the present cycle immediately ends. On the other hand, if the identification signal from the portable information terminal 10 is not being received, the process proceeds to step S402.

In step S402, it is determined by the warning generation determination portion 24 whether or not the vehicle is moving, on the basis of the signal from the vehicle speed sensor 40. If the vehicle is moving, the process proceeds to step S404. If the vehicle is not moving, that is, if the vehicle is at a stop, there is no need for warning, and the process of the present cycle immediately ends.

In step S404, the warning generation determination portion 24 sends a command to output a warning sound; or a warning from the warning indicator 32. Due to this, the warning from the warning indicator 32, or the warning sound is output.

Thus, according to the process shown in FIG. 4, when a safety-considered application is being executed in the foreground in the portable information terminal 10 connected to the vehicle-mounted apparatus 12, the warning is not generated regardless of whether or not the vehicle is moving. On the other hand, when a safety-considered application is not being executed in the foreground, the warning is generated if the vehicle is moving, and the warning is stopped if the vehicle is at a stop. Therefore, according to this embodiment, it is possible to appropriately prevent execution of applications in which safety has been taken into account (i.e., applications that are other than the safety-considered applications) and that can be executed in the portable information terminal 10 of the vehicle-mounted apparatus 12. Besides, since a safety-considered application can be made merely by adding a function of sending the identification signal as shown in FIG. 1, the load on creation of applications will not considerably increase. Besides, since the making of a safety-considered application does not require a substantial change in the main program and the like on the portable information terminal 10 side, the provision of the identification signal-sending function can be completed on the application producer side. Besides, in the case where the identification signal is encrypted, it becomes difficult at the application producer side to freely add the identification signal-sending function unjustly (without obtaining a permission from the automobile manufacturer), which increases safety.

Incidentally, the execution of the process routine shown in FIG. 4 may be repeated preferably at a period of 1 second or less (e.g., 500 ms) in order to enhance the usefulness of the warning, similarly to the process shown in FIG. 3. This is because if the period of execution is long, a state in which it is not known whether or not a safety-considered application is being executed continues for a long time until the next acquisition and determination of the identification signal, and such continuation of the state is not preferable from the viewpoint of safety. For example, in the case where the period of the execution is as long as 10 minutes, even if the safety-considered application actually ends before 10 minutes elapses, processing is performed for the entire time of 10 minutes in substantially the same manner as in the case where the safety-considered application is being executed.

Figure 6A:
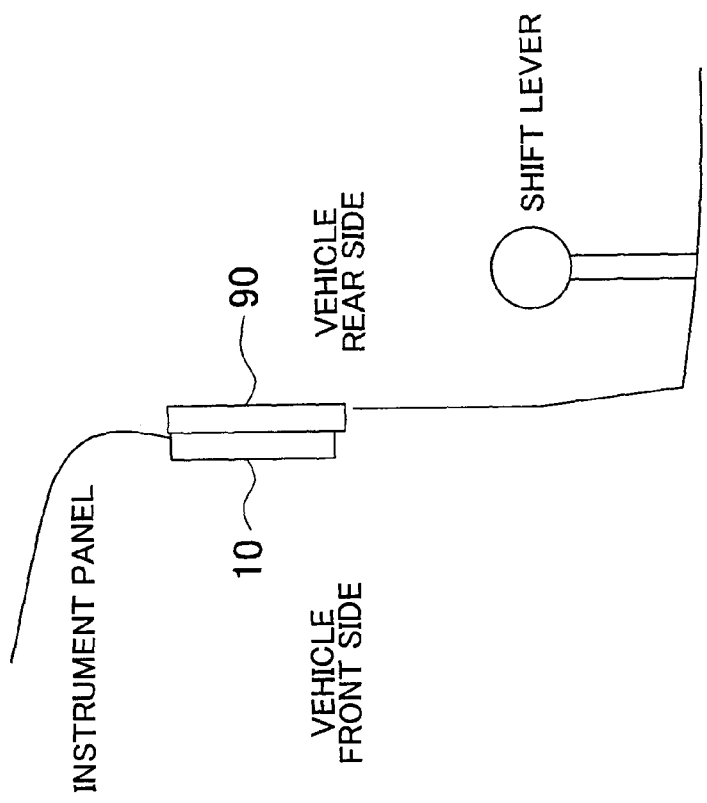
FIGS. 6A and 6B are diagrams schematically showing an example of a manner of restricting the use of a portable information terminal by a lid, in a cross-sectional view that is viewed from a side of the vehicle, of the embodiment.
Figure 6B:
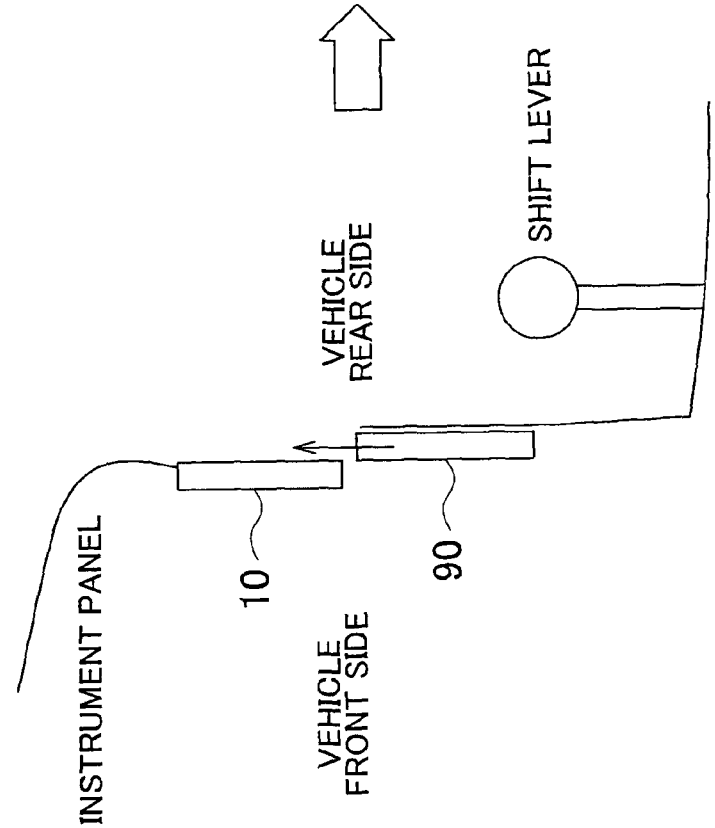

FIG. 5 is a diagram showing an example of a construction related to a vehicle-mounted apparatus 112 according to another embodiment of the invention. FIGS. 6A and 6B are diagrams conceptually showing an example of a manner of use restriction of a portable information terminal 10 via a lid 90.

The vehicle-mounted apparatus 112 of this embodiment is different from the vehicle-mounted apparatus 12 of the foregoing embodiment shown in FIG. 1 and the like, mainly in that the vehicle-mounted apparatus 112 includes an electric power feeder portion 50, and a lid-driving actuator 60. However, the electric power feeder portion 50 may also be set in the vehicle mounted apparatus 1 of the foregoing embodiment shown in FIG. 1 and the like. Besides, the constructions that may be the same as those of the foregoing embodiment are denoted by the same reference characters, and will not be described again.

The electric power feeder portion 50 feeds electric power from a vehicle-mounted battery to the portable information terminal 10 that is connected to the vehicle-mounted apparatus 112. Because of this, the portable information terminal 10 is able to operate without using the electric power from its built-in battery. Besides, the electric power feeder portion 50 may be capable of charging the built-in battery of the portable information terminal 10 with electric power from the vehicle-mounted battery.

The lid-driving actuator 60 generates motive power for driving the lid 90 (see FIGS. 6A and 6B) between a use permission position (FIG. 6A) and a use restriction position (FIG. 6B). The lid-driving actuator 60 may be an electric motor. The lid 90 has an external shape such as to cover a front surface of the portable information terminal 10 (the display screen and/or an operating portion thereof). The lid 90 is movable (e.g., movable by a slide mechanism) between a position at which the front surface of the portable information terminal 10 is open (the use permission position) as shown in FIG. 6A and a position at which the lid 90 covers the front surface of the portable information terminal 10 placed in the vehicle (the use restriction position) as shown in FIG. 6B. The driving mechanism of the lid 90 may be an arbitrary mechanism such as a rack-and-pinion mechanism, a ball screw mechanism, etc.

The lid-driving actuator 60 is controlled by a warning generation determination portion 24 of a control ECU 20 of the vehicle-mounted apparatus 112.

FIG. 7 is a flowchart showing an example of a main process that is executed by the control ECU 20 of the vehicle-mounted apparatus 112. The process routine shown in FIG. 7 is started when the portable information terminal 10 is connected to the vehicle-mounted apparatus 112 either by wire or wirelessly, and is repeatedly executed while the portable information terminal 10 remains connected to the vehicle-mounted apparatus 112. The execution of the process routine shown in FIG. 7 may be repeated preferably at a period of 1 second or less (e.g., 500 ms) in order to enhance the usefulness of the warning.

The contents of the processes of steps S700, S702 and S704 may be the same as those of steps S400, S402 and S404 shown in FIG. 4. However, if in step S700 of the process routine shown in FIG. 7, the identification signal from the portable information terminal 10 is being received, the process goes to step S708, after which the process in the present cycle ends. Besides, in the process routine shown in FIG. 7, the process of step S704 is followed by step S706.

In step S706, the warning generation determination portion 24 generates a signal for driving the lid-driving actuator 60 so as to move the lid 90 to the use restriction portion (FIG. 6B). Therefore, the lid 90 covers the front surface of the portable information terminal 10 that is placed in the vehicle, so that the vehicle occupant is not able to see the portable information terminal 10, and therefore safety can be increased. Incidentally, if the lid 90 has already been at the use restriction position due to the process in the previous cycle, the use restriction position is maintained in the present cycle.

In step S708, the warning generation determination portion 24 generates a drive signal for driving the lid-driving actuator 60 so as to move the lid 90 to the use permission position (FIG. 6A). Therefore, the front surface of the portable information terminal 10 is uncovered, so that the vehicle occupant is able to see (or operate) the portable information terminal 10. Incidentally, if the lid 90 has already been at the use permission position due to the process in the previous cycle, the use permission position is maintained in the present cycle.

Thus, according to the process shown in FIG. 7, substantially the same effects as achieved by the process shown in FIG. 4 can be achieved. Besides, since restriction of the use of the portable information terminal 10 can be carried out in a forced manner by the lid 90, the effectiveness of the warning can be further increased.

Incidentally, although in the process shown in FIG. 7, both the warning in step S704 and the warning in step S706 are carried out, the warning in step S704 may be omitted.

While the preferred embodiments of the invention have been described above, the invention is not restricted by the foregoing embodiments. On the contrary, various modifications and substitutions can be made in the foregoing embodiments without departing from the scope of the invention.

For example, in the foregoing embodiments, the identification signal is sent from the portable information terminal 10 if a safety-considered application is being executed in the foreground. This construction is made due to a consideration that in the case of a portable information terminal 10 capable of multitask operation, an application other than the safety-considered application can possibly be being executed in the foreground while a safety-considered application is being executed in the background. However, in the case of a portable information terminal 10 incapable of simultaneously executing two or more applications, or the like, it suffices that the portable information terminal 10 sends the identification signal if a safety-considered application is being executed.

Besides, in the foregoing embodiments, the identification signal is sent from the portable information terminal 10 if a safety-considered application is being executed in the foreground. However, considering a portable information terminal 10 capable of executing a plurality of applications in the foreground, the system may be constructed so that the portable information terminal 10 sends the identification signal if a safety-considered application is being executed in the foreground and on the full screen. Application may be stored in a computer-readable medium.

The invention claimed is:

1. A vehicle-mounted apparatus to which a portable information terminal loaded with a plurality of application programs is connected, wherein the application programs include at least one safety-considered application that is configured to send an identification signal to the vehicle-mounted apparatus identifying itself as having an attribute of being permitted to be used during moving of a vehicle, the vehicle-mounted apparatus comprising:
a controller that is configured to output caution or warning information to an occupant in a vehicle, during moving of the vehicle, wherein
based upon the vehicle-mounted apparatus connected to the portable information terminal not continually receiving the identification signal from the portable information terminal from an application program that is presently being operated in a foreground of the portable information terminal, the controller is configured to determine that the application presently being operated in the foreground of the portable information terminal is not the at least one safety-considered application, and to output the caution or warning information as a result of the determination.

2. The vehicle-mounted apparatus according to claim 1, wherein the caution or warning information includes information that use of the application program during the moving of the vehicle is not desirable or not permitted.

3. The vehicle-mounted apparatus according to claim 1, wherein the identification signal sent from the portable information terminal is encrypted.

4. The vehicle-mounted apparatus according to claim 1, further comprising
a vehicle speed sensor that detects speed of the vehicle in which the vehicle-mounted apparatus is mounted, wherein
the controller outputs the caution or warning information if it is determined that the vehicle is moving, based on a result of detection by the vehicle speed sensor.

5. The vehicle-mounted apparatus according to claim 1, further comprising:
a movable lid that covers a front surface of the portable information terminal; and
a lid-driving actuator that drives the lid, wherein output of the caution or warning information comprises driving the lid by using the lid-driving actuator so that the lid covers the portable information terminal.

6. An application program use restriction method that restricts use of a specific application program installed in a portable information terminal loaded with a plurality of application programs, wherein the portable information terminal is connected to a vehicle-mounted apparatus, wherein the application programs include at least one safety-considered application that is configured to send an identification signal to the vehicle-mounted apparatus identifying itself as having an attribute of being permitted to be used during moving of a vehicle, comprising:
outputting caution or warning information to an occupant in the vehicle, during moving of the vehicle, so that the occupant does not use an application program that is presently being executed in the portable information terminal, wherein
based upon the vehicle-mounted apparatus not continually receiving the identification signal from the portable information terminal from an application program that is presently being executed in a foreground of the portable information terminal, determining that the application presently being operated in the foreground of the portable information terminal is not the at least one safety-considered application, and then outputting the caution or warning information as a result of the determination,
wherein the caution or warning information that is output to the driver restricts the use of the application program that has been determined to not be the at least one safety-considered application from being executed in the foreground.

* * * * *